United States Patent
Jones et al.

(10) Patent No.: US 10,102,499 B2
(45) Date of Patent: Oct. 16, 2018

(54) TOWER INVENTORY SYSTEM

(71) Applicants: Barry Jones, Winchester, CA (US); C. E. Bowden, Fayetteville, TN (US)

(72) Inventors: Barry Jones, Winchester, CA (US); C. E. Bowden, Fayetteville, TN (US)

(73) Assignee: R.F.I.D Inventory Systems, Inc., Winchester, CA (US)

( * ) Notice: Subject to any disclaimer, the term of this patent is extended or adjusted under 35 U.S.C. 154(b) by 0 days.

(21) Appl. No.: 15/297,100

(22) Filed: Oct. 18, 2016

(65) Prior Publication Data

US 2017/0109558 A1    Apr. 20, 2017

Related U.S. Application Data

(60) Provisional application No. 62/243,115, filed on Oct. 18, 2015.

(51) Int. Cl.
*H04Q 5/22* (2006.01)
*G06Q 10/08* (2012.01)

(52) U.S. Cl.
CPC .................. *G06Q 10/087* (2013.01)

(58) Field of Classification Search
CPC .................................................. G06Q 10/087
See application file for complete search history.

(56) References Cited

U.S. PATENT DOCUMENTS

| | | | | |
|---|---|---|---|---|
| 7,693,757 B2* | 4/2010 | Zimmerman | ......... | G06Q 10/00 235/462.11 |
| 2007/0063844 A1* | 3/2007 | Jenney | ..................... | G06K 1/18 340/572.1 |
| 2008/0094214 A1* | 4/2008 | Azevedo | ............ | G08B 13/1427 340/568.1 |
| 2012/0287095 A1* | 11/2012 | Cote | ..................... | G06Q 10/08 345/204 |

* cited by examiner

*Primary Examiner* — Erin M File
(74) *Attorney, Agent, or Firm* — Owen J. Bates (57) ABSTRACT

A movable Tower Inventory System which contains a number of RFID antennas mounted vertically along the tower. The Tower Inventory System is the moved along the front of storage racks to acquire information from RFID tags affixed to assets positioned on the storage rack. This information enables the determination of the x, y and z location values for each unique RFID number stored in the RFID tags.

14 Claims, 7 Drawing Sheets

TOWER INVENTORY SYSTEM

CROSS-REFERENCE TO RELATED APPLICATIONS

The present application claims the benefit of U.S. Provisional Application No. 62/243,111, filed on Oct. 28, 2015, which is hereby incorporated by reference in its entirety.

BACKGROUND OF THE INVENTION

Modern day commercial activity is very much dependent on the shipping and warehousing of various types of products and manufactured goods. Just in time manufacturing requires the highest level of efficiency in terms of managing the shipping and storage of goods.

One of the key elements is to have a large stockpile of goods stored in huge warehouses. Warehouses today can be as large or larger than 800,000 square feet, a quarter of a mile long and have storage systems that can be 20 feet tall.

In order to benefit from the large number of goods being stored, one must be able to know exactly how much of a particular product is in the warehouse. When orders come in, the vendor must be able to determine quickly if they have the proper number of the ordered goods on hand. Even though computer tracking systems are efficient in monitoring the sales and receipt of goods, there periodically has to be a reconciling of inventory. Reconciling means to compare an actual physical counting of the goods and compare that to what the computer tracking system states.

In addition, it's very important know where the goods are in the warehouse. Typically storage systems in a warehouse are assigned some type of location identification number. That number is then recorded in whatever inventory tracking system is used. However, sometimes the location identification is mistakenly entered or the goods are accidentally placed in the wrong location. If the goods aren't where the inventory system says they should be, then much time is wasted physically inspecting the entire warehouse to find the goods. This is made even more time consuming because many warehouse shelving systems are 20 feet high and someone has to gain access to the upper shelves via some sort of movable ladder or a mechanical lift. Sometimes pallets of material have to be taken down to access goods that are located toward the back of the shelves and obscured by other goods.

There have been other attempts to make a useful and efficient method of automating a warehouse inventory system.

U.S. Pat. No. 7,693,757, "SYSTEM AND METHOD FOR PERFORMING INVENTORY USING A MOBILE INVENTORY ROBOT", describes a mobile inventory robot which is primarily designed to navigate through a retail store. The described robot includes an obstruction avoidance system, motorized drive wheels, a self-docking power recharging systems, and very sophisticated imaging processing systems to read bar codes on shelves and capture images of products on the shelves. In order to identify a product, an image captured during an inventory process must be compared to visual characteristics of the product (size, color, texture, images from multiple views) which has been previously entered into an inventory database.

It isn't clear that the system can actually generate a count of the number of items on a shelf. As shown in FIG. 7B the imaging camera can only see the items that are in front of a group of similar items. For instance, some Items 775 are in the back row and are therefore essentially invisible to the camera.

In order to efficiently and safely navigate the robot through the store, a number sensors are required, such as ultra-sonic detectors, retroreflective detectors, infrared transmitters and infrared receivers.

In addition, the navigation system may sometimes be unable to move the robot through the store and manual intervention by a human operator would be necessary to either remove the obstacle or reprogram the robot to avoid the obstacle.

The robot further includes a mechanical positioning system which can raise and lift the detection devices in order to read items stored in higher shelves. Not only does this increase the time to do an inventory because of the time taken to raise and lower the detectors but it also increases the chance of mechanical failure and maintenance costs.

Another attempt to produce an efficient inventory system is described in U.S. Patent Publication 2016/0239021, "AUTOMATED INVENTORY TAKING MOVABLE PLATFORM". The automated moveable platform as described in the published application also utilizes a number of sensors. Shown in FIG. 1 is a light sensor 106, a radiation sensor 109, a camera 103, a humidity sensor 102, a temperature sensor 108, and a collision sensor 105. Further, paragraph [0009] requires "at least one of a camera, an IR-sensor, a laser ranging sensor, an ultrasound sensor, a collision sensor, a humidity sensor, a light sensor, a temperature sensor, a pressure sensor, a gas sensor, a radiation sensor, a radiofrequency or WiFi sensor, a positioning sensor."

In addition, as described in paragraph [0021], the navigation system will adjust the speed and path of the robot depending on data regarding first time identified objects and previously identified objects.

In order to increase the reliability of the detection system, one or more of RFID antennas are able to move and/or rotate horizontally or vertically. Such an antenna system increases costs and maintenance time.

The previously described inventory systems are very complicated. They require multiple sensors, image capture and analysis software, motorized drive mechanisms and sophisticated software to control the path of the robot and avoid obstacles.

BRIEF SUMMARY OF THE INVENTION

The invention provides hardware that can be moved through a warehouse and reads the RFID products tags that are affixed to the goods stored in the warehouse. The invention is moved through the warehouse by an existing forklift which is ubiquitously found in warehouses. This eliminates the added costs and maintenance of drive system. In addition, because it is being navigated by a forklift operator, the need for navigation waypoints and collision avoidance systems is eliminated. The invention further provides for software which can determine the x, y and z coordinates of the goods within the warehouse and display the location of a particular RFID tag on a 3D representation of the warehouse. The software can also disclose if a good has been moved from the location where it was found on a previous inventory by comparison to x, y, and z location data from a stored previous inventory.

The present invention provides a tower containing multiple RFID antennas and readers. The tower is typically about 20 feet tall and contains 16 RFID antennas and 4 readers. Typically each reader can handle four antennas. This would allow the invention to inventory goods on pallets racks that are four shelves high. The tower is mounted on a heavy base which typically weights about 1000 lbs. in order to provide a stable platform for the 20 ft tower. Also mounted on the base is an equipment cabinet which houses the necessary power sources, computer and networking hardware and the PoE switch/router. The combination of the base, equipment cabinet and tower are referred to as the Tower Inventory System (TIS).

The TIS could be moved through the warehouse by any number of means which includes but is not limited to moving the tower with a forklift, motorized pallet jacks, electric carts, placing the tower on wheels and manually pushing through the warehouse, and transporting the tower via overhead tracks. These tracks would be mounted to ceiling and would allow movement through the warehouse without the need for an operator. The TIS would be transported along the tracks by the use of motorized rollers and/or wheels. The preferred method of moving the TIS is by the use of existing equipment such as a forklift or motorized pallet jack.

The TIS can accommodate various types of asset packing densities in which the asset density is very low to ones in which essentially all of the pallet space is filled with packages that would not be amenable to being inventoried by optical or visually means. Even assets that are completely surrounded—top, bottom, left, right, front and back—could be inventoried by adjusting the RF power of the RFID reader. The inventory software can be programmed to vary the RF power of the RFID reader as the TIS moves through the warehouse to accommodate different asset packing densities that may exist in a single warehouse.

BRIEF DESCRIPTION OF THE SEVERAL VIEWS OF THE DRAWINGS

The above summary of the present invention is not intended to represent each embodiment, or every aspect, of the present invention. Additional features and benefits of the present invention will become apparent from the detailed description, figures, and embodiments set forth below.

The accompanying drawings are not intended to be drawn to scale. For a more complete understanding of the present invention and the objects and advantages thereof, reference is now made to the following descriptions taken in connection with the accompanying drawings in which.

DETAILED DESCRIPTION OF THE PREFERRED EMBODIMENT

A. Overview of How to Utilize the Invention

1. The first step is to carefully measure the location of all of the storage racks in the warehouse. An arbitrary starting point is assigned which would become the 0,0 origin of the map of the warehouse. The x-axis would typically be oriented to be parallel with the long axis of the majority of storage racks. Then the location of each of the Vertical Supports 57 would be documented. In addition the height and number of shelves in each storage rack would be documented as well. All of this information is then utilized by a 3D program (such as Sketchup) to generate a 3D representation of the warehouse storage system.

2. Then RFID Location Tags are attached near the bottom of each of the Vertical Supports 57. The RFID Tag number for each Vertical Support 57 is then entered into the 3D program and associated with the corresponding Vertical Support 57 element in the 3D program.

3. Then a forklift is positioned so that the forks will enter into the Fork Access Holes 180 located at the bottom of Base 175. Then the Fork Attaching Bolts 182 are tightened which secures the TIS to the forklift.

The operator then positions the TIS near the staring point of the inventory path that the forklift operator will follow. The inventory program is then started on the computer by the operator entering a User ID. Other means of identification such as magnetically-coded badges and various biometric verification means. The forklift operator then drives the forklift and TIS along a defined inventory path along the front of each of the storage racks.

Figure 2:
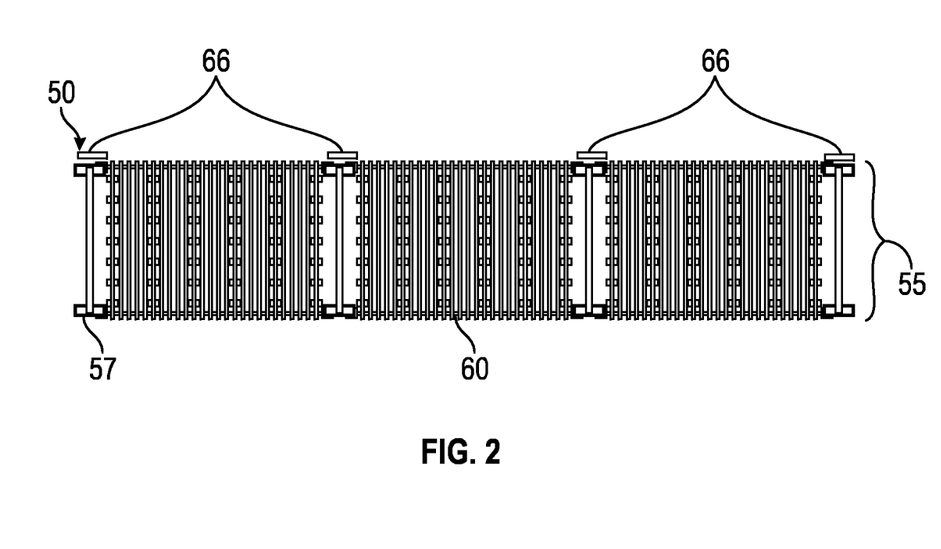
FIG. 2 depicts a representation of a portion of a warehouse storage system map.

Some storage racks will be only one shelf deep as shown in FIG. 2. In some cases there will two storage racks placed back-to-back. In each case the inventory path can include both the front and back side of the storage racks if needed to achieve a complete inventory of the warehouse.

Once the program is started, the antennas are continually gathering data from the RFID tags. This would include both the RFID Location Tags and the RFID Asset Tags which are placed on the various items which can be pallets, cases, cartons, or free standing items.

Each time an RFID tag is energized by RF energy from the antenna, the RFID tag will return the following information:

RFID identification number;
date and time stamp when the data was acquired;
the reader and antenna number that received the information from the tag;
the user ID that was entered when the inventory program was started; and
the strength of the signal received from the RFID tag.

This information is stored on the computer and is available for various inventory and reporting purposes.

B. Calculation of the x, y and z Location Values for an RFID Tag

Description of the Method to Calculate x, y, and z Coordinates for a Particular Asset Tag.

After the TIS has been moved across the front of all of the storage racks, a data file is created which contains the information from the RFID tags. The information received from any RFID tag includes:

the RFID number—typically 96 bits long;
a time stamp having date and time the data was acquired;
Reader number;
Antenna number;
Signal Strength; and
User ID.

A sample of the data that might be obtained from a single RFID tag is shown below:

| | |
|---|---|
| RFID No. | 4A3B4A3C4A3D4A3E4A3F4A40 |
| Maximum signal strength | 1914.9 |
| Time and date stamp | 2015-09-22 18:34:15 |
| Reader No. | 2 |
| Antenna No. | 3 |
| User ID | Bob Smith |

Each set of this data is referred to as an RFID data record.

As part of the preparation for conducting the inventory, the position of all of the warehouse racks and shelves have been carefully measured and a 3D layout of the warehouse is created in a program such as Sketchup, AutoCad or other 3D drawing program.

In addition, RFID Location Tags are affixed to the Upright Frames near the bottom. These tags can have random RFID numbers or be part of a separate series of RFID numbers set aside for the Location Tags. Data from the Location Tags are gathered and stored along with all of the RFID Asset Tags affixed to the goods on the shelves as the TIS is moved through the warehouse.

After all of the RFID data has been stored, a user can query the program in many different ways. However, the first and most critical calculation that the program makes is to determine the x, y, and z coordinates of the requested RFID tag.

Asset labels can be printed with human readable information such as a product description, SKU numbers, vendor etc. In addition the same label can be printed with an RFID inlay which is programmed to contain a predetermined RFID number. If needed, optical bar codes can also be printed on the label or carton.

The first step in responding to just about every program request from a database user is to identify where in the warehouse each unit of a particular product is located. This will require the calculation of the x, y and z values for every one of the requested items (e.g. pallet, case, carton or product).

Calculation of the x Value

As the TIS is moved through the warehouse it will receive and store RFID data from each RFID tag a multiple number of time because that RFID tag will be in range of one or more RFID antennas multiple times as the TIS moves long in front of the storage racks. The software can average all of the data records from a particular antenna number so that the Time stamp and signal strength values are an average for that particular RFID tag. This average can be done in real time as the TIS moves through the warehouse if there is a need for real time location of assets, If not, then after the entire warehouse has been scanned, the averages can be made and stored in a separate data file to increase the efficiency of later inventory requests. References to RFID data below shall be construed to mean the average of the multiple RFID data records that were recorded.

Because the RFID location tags are known and can be identified in the data file, the two RFID Locations tags nearest to the RFID asset tag for one of the requested products can be identified.

Because the two RFID Location Tags are time stamped, the amount of time it took for the Tower to have moved from the location of the first RFID Location Tag to the second RFID location tag can easily be calculated. Because the RFID data for the product in question is also stored, one can calculate the percentage distance along the line between RFID Location Tag 1 and RFID Location Tag 2 that the Asset tag is locate.

Because the actual physical location in the warehouse of all of the RFID Location Tags is known, the displacement of the Asset from either of the RFID Location Tags can be calculated.

As an example, if the difference between the time stamp of the first RFID Location tag and the second RFID Location Tag is 6.5 seconds and the physical distance between the first RFID Location Tag and the second RFID Location Tag is 10 feet, then the Tower array was moving an average of 1.5 feet per second for that time period. If the Asset Tag time stamp is 3 seconds later in time than that of the first Assets Location Tag then the X value for the Asset tag is 3×1.5 feet or 4.5 feet from the first Asset tag in the direction of movement of the TIS.

Calculation of the z Value

The physical elevation of teach of the RFID Antennas is a known quantity and is included as set of fixed constants in the TIS software.

The Table I below would be typical of the RFID Antenna elevation data.

TABLE I

| Reader #/Antenna # | Reader IP Address | TIS Antenna # | Distance above the ground |
| --- | --- | --- | --- |
| Reader 1 - Antenna 0 | 192.168.1 | 1 | 16" |
| Reader 1 - Antenna 1 | 192.168.1 | 2 | 32" |
| Reader 1 - Antenna 2 | 192.168.1 | 3 | 48" |
| Reader 1 - Antenna 3 | 192.168.1 | 4 | 64" |
| Reader 2 - Antenna 0 | 192.168.2 | 5 | 80" |
| Reader 2 - Antenna 1 | 192.168.2 | 6 | 96" |
| Reader 2 - Antenna 2 | 192.168.2 | 7 | 112" |
| Reader 2 - Antenna 3 | 192.168.2 | 8 | 120" |

Because the x value is calculated first, the average time stamp is known. All of the data records for the RFID ID number being looked for will be reviewed and only those data records wherein the time stamp is plus or minus 0.5 seconds of the average time stamp that was used to determine the x value, will be utilized to calculate the Z value. The height above the ground for each of the antennas in the subset being considered will be taken from Table I above. Then the Z value will be the average of the heights for each of the data records in the Z value subset.

Calculation of the y Value

The signal strength for each of the data records for the RFID number whose location is being determined is compared to the Signal Strength Values in column B of Table II below. One of the rows in Table II below is selected based on which row the data record signal strength falls within the value shown in Column B. Then the Position Variable for that selected row is subtracted from the y value of the Location tag nearest the left side of the asset x value by the amount of the Position Variable. This value is the y value of the asset being evaluated.

As an example, if the Signal Strength of the data record for the asset being evaluated was 1500 then row 2 is selected. The Position Variable from Column C/Row 2 is −2 feet.

The y Location Value of the RFID Location Tag to the immediate left of the data record being evaluated is 352.1. Note that all RFID Location Tags along one linear stretch of shelve will generally be the same because the y axis used for the warehouse layout is usually drawn so that the shelves are parallel with the y axis. Subtracting 2 feet from 352.1 feet yields 350.2 feet. Thus the y value is 350.2 based on the x, y plot of the whole warehouse. Another way to understand this value is that the Asset is located 2 feet back from an imaginary y axis plane that runs along the front of the storage rack.

The values in Column C of Table II are determined empirically and the strength of the RF irradiation signal reader can be adjusted so that range of the reader would be roughly equivalent to the depth of the shelving used in a particular warehouse.

Thus we have determined the x, y and z values based on the data in a single data record having the RFID number of the asset being evaluated.

Once x, y and z values can be determined then any manner of database inquires, reports and 3D representations can be generated based upon this location data.

TABLE II

| Row | A<br>Location Tag Y<br>Data | B<br>Received Signal<br>Strength Value | C<br>Received Signal<br>Strength Max<br>Position<br>Variable | D<br>RFID<br>Asset Tag<br>Y Position |
|---|---|---|---|---|
| 1 | 352.1 feet | 1-1000 | −1 ft | 351.1 |
| 2 | 352.1 feet | 1001-2000 | −2 ft | 350.1 |
| 3 | 352.1 feet | 2001-3000 | −3 ft | 349.1 |
| 4 | 352.1 feet | 3001-4000 | −4 ft | 348.1 |
| 5 | 352.1 feet | 4001-5000 | −5 ft | 347.1 |

C. Detailed Description of the TIS

Figure 1:
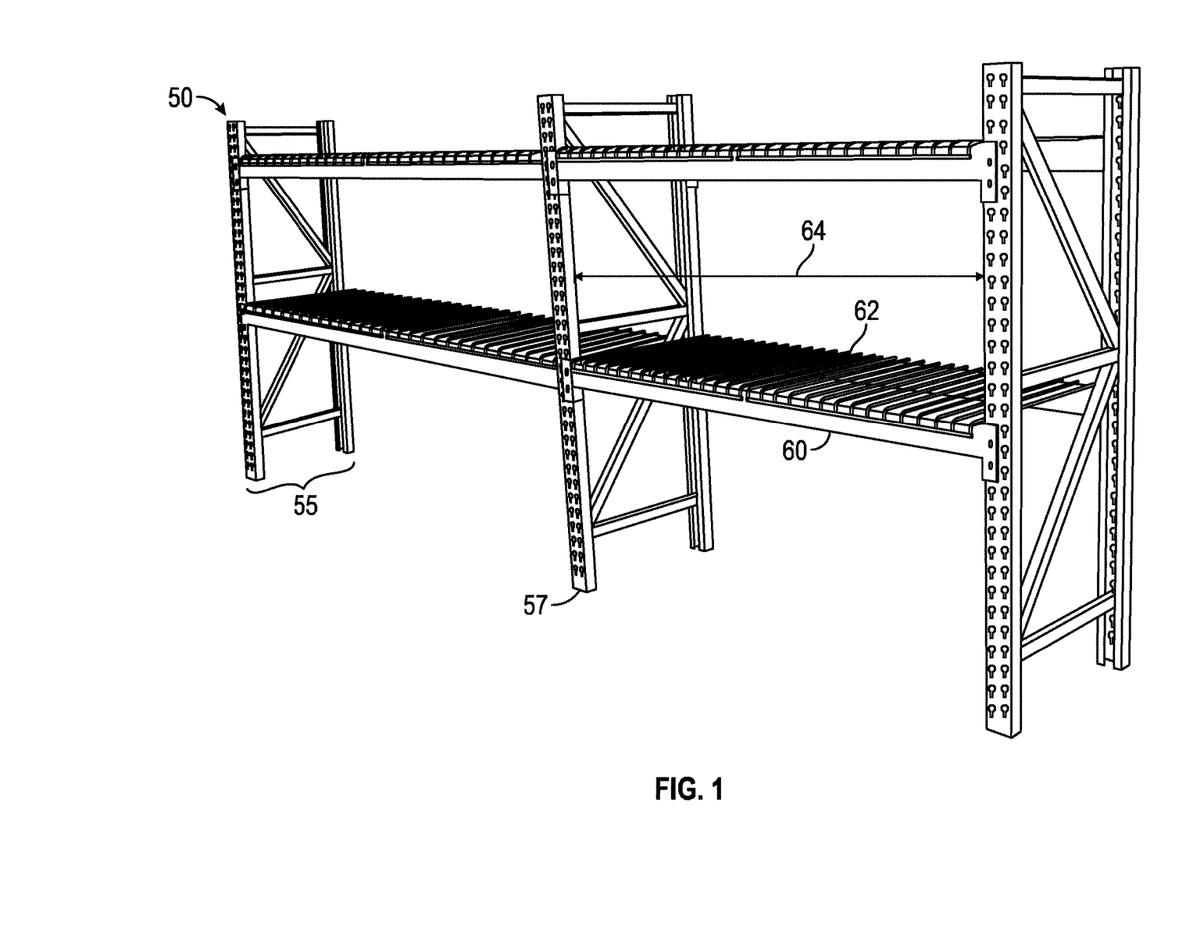
FIG. 1 depicts a typical warehouse storage rack.

FIG. 1

Ideally the inventory system of the present invention will be used with storage systems which are multiple levels high and linearly arranged. A typical Storage System 50 that would be used in conjunction with the inventory system is shown in FIG. 1.

A Storage System 50 generally includes a number of Upright Frames 55 which is formed from two Vertical Supports 57 and cross bracing between the Vertical Supports 57. A number of Pallet Rack Beams 60 are rigidly affixed between the Vertical Supports 57. Shelves 62 are placed across a pair of Pallet Rack Beams 60. A Pallet Space 64 is the storage area formed by two Upright Frames 55 and four Pallet Rack Beams 60.

The additional storage systems similar to that shown in FIG. 1 may be placed on top of each other. In addition, additional Upright Frames 55 and Pallet Rack Beams 60 can be added to either end of the Storage System shown in FIG. 1. The length of such a Storage System is limited only by the space available in the warehouse. In terms of height, the typical storage system is limited to four Pallet Spaces 64 high because that is usually the reach of commercially available fork lifts.

FIG. 2

A plan view of a simple Storage System 50 is shown in FIG. 2. All of the Vertical Supports 57 have coordinates that are assigned to them in the CAD drawing of the warehouse. The CAD drawing is done to scale so that the actual distances between all of the Vertical Supports can be determined from the CAD drawing.

Also shown in FIG. 2 are the RFID Location Tags 66. These RFID tags are affixed near the bottom of each of the Vertical Support and are unique. The RFID Location Tags will be used to help identify the x, y, z location values for of assets that are stored on the shelves.

The x value is the distance along a line formed by all of the Vertical Supports of a single rack system. The y value is the distance from the front edge of the shelf that the asset is placed upon. The z value is the height above the floor

Figure 3:
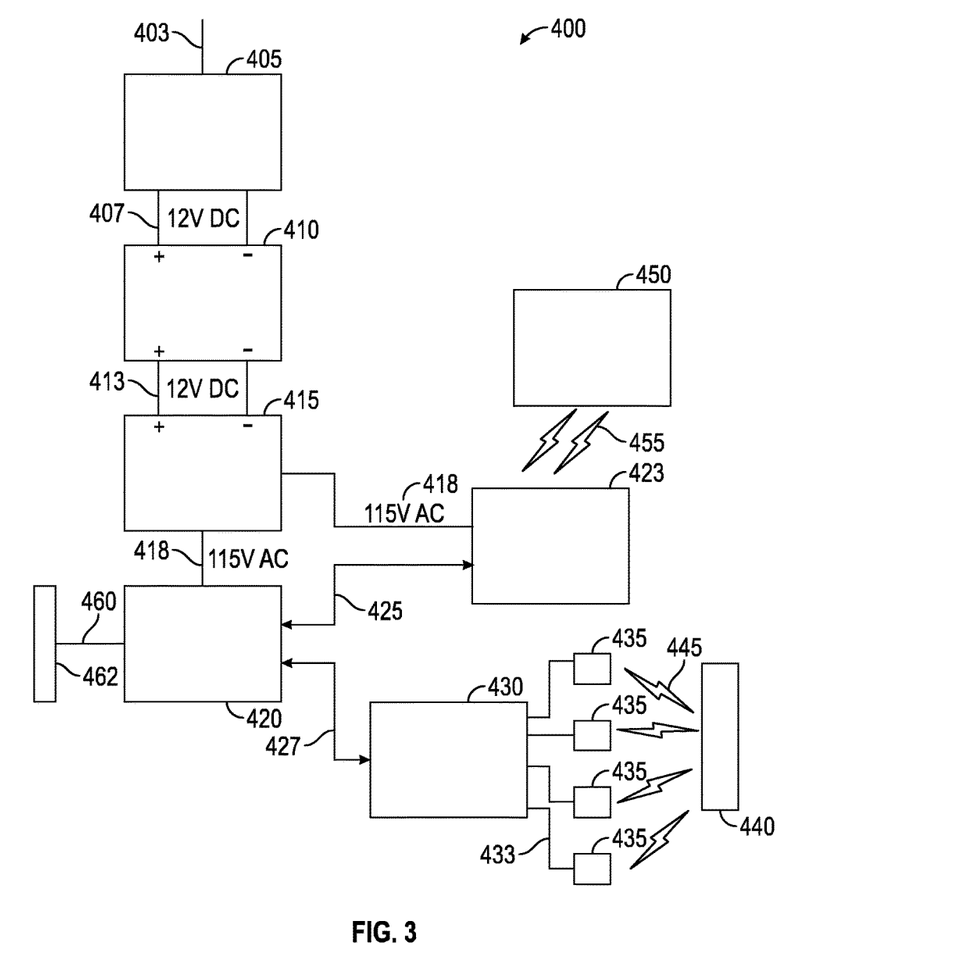
FIG. 3 is a block diagram of the hardware components of the invention.

FIG. 3

FIG. 3 shows a generalized circuit diagram of one embodiment of the invention. Standard 115/120 VAC power is provided via a standard wall outlet. Typically the entire inventory system is moved near a standard electrical outlet. Battery Charger 405 can be plugged into the standard electrical outlet via a standard 115 volt power cord.

Battery Charger 405 provides 12 VDC current over 12 VDC wiring 407, which runs from the outlet of the Battery Charger 405 to the 12 VDC Battery 410.

12 volt power is carried by Wiring 413 to Inverter 415 which provides 115 VAC power 418 to Power over Ethernet (PoE) Switch/Router 420 and Computer 423. Power and communication signals are sent to and from the RFID Reader via PoE Wiring 427. RFID Reader 430 communicates with RFID Antennas via Wiring 433. RFID Antennas 435 send RF energy to and receive RF signals back from RFID tags 440 which can be either RFID Location Tags 66 or Asset Location Tags.

Computer 423 can send and receive information via Wireless RF signals 455 to and from a Remote Computer 450. Router 420 can optionally be in communication with a facility Communications Network 462 via Cable 460 and communicate with Remote Computer 450 or any resource on the Internet. This enables Computer 423 to send and acquire data and communicate with any manner of inventor, ordering software, and financial software.

Figure 4:
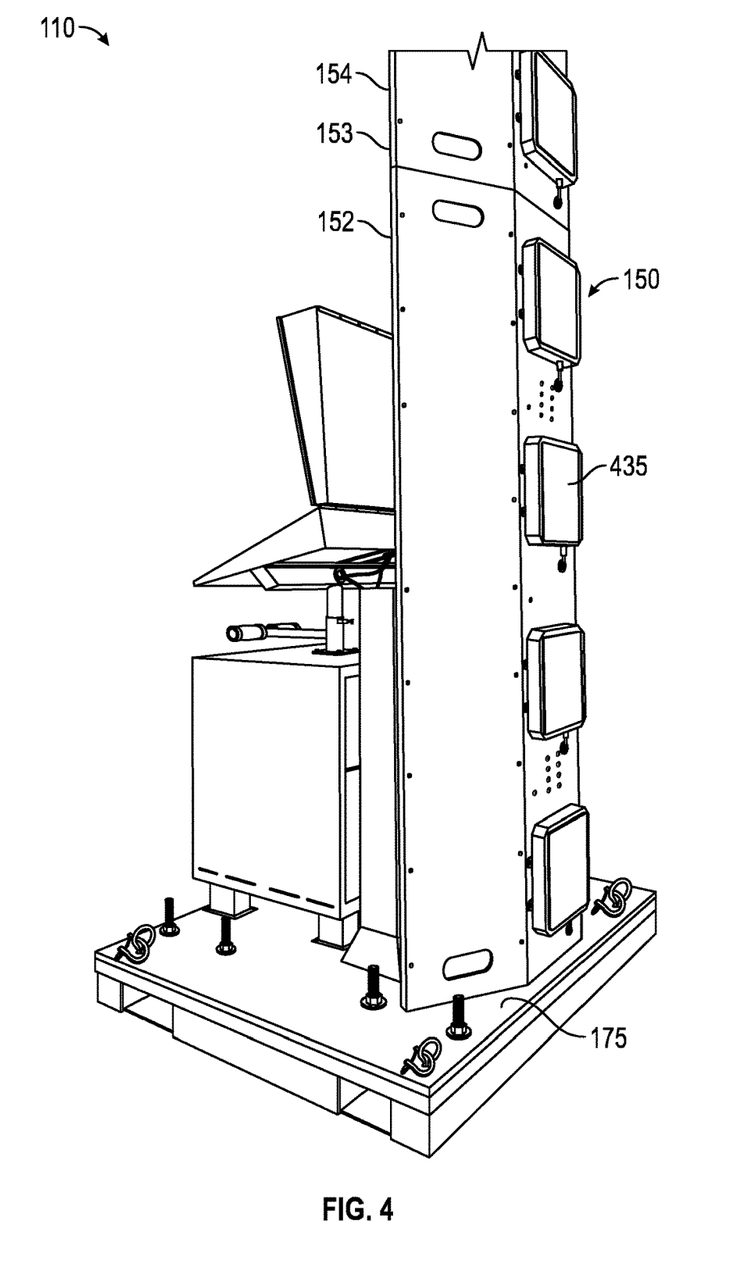
FIG. 4 depicts the primary components of one embodiment of the invention.

FIG. 4

A partial view of one embodiment of the invention is shown in FIG. 4. All of the hardware rests on Base 175 which is formed from heavy plate metal and weights about 1000 lbs. Attached to Base 175 is Equipment Cabinet 110. One more Panels 152 and 154 are attached to Base 175 and to each other. Seam 153 is where the lower Panel 152 is positioned next the second Panel 154. This embodiment has a total of four Panels of which the upper two are not shown in FIG. 4. There are four RFID Antennas 435 affixed to each of the four Panels 152. All of the Panels together, regardless of the number of Panels constitute the Antenna Tower 150.

Figure 5:
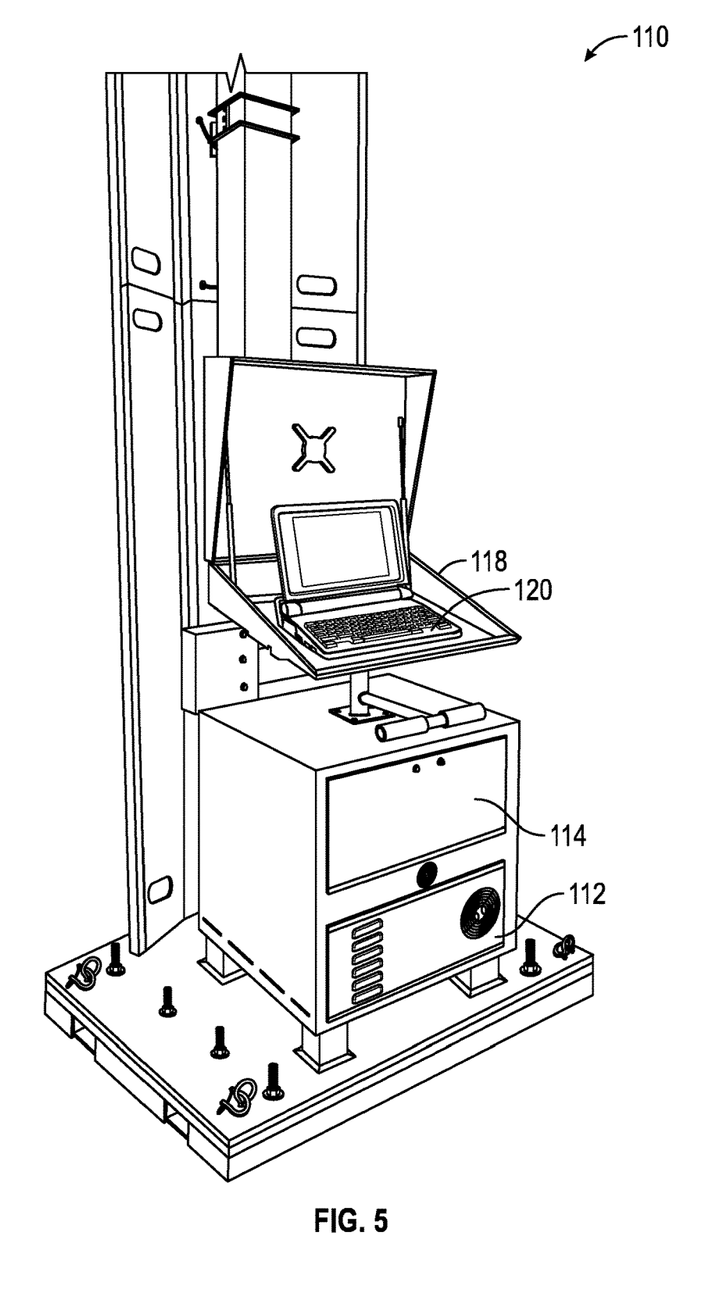
FIG. 5 depicts details of the Equipment Cabinet 110.

FIG. 5

Further details of Equipment Cabinet 110 are shown in FIG. 5. There is a Lower Cabinet 112 and the Upper Cabinet 114. Computer 120 is located in Computer Clamshell 118, which can optionally be lockable in order to restricted and/or control access. Contained within either Lower Cabinet 112 or Upper Cabinet 114 are the Battery Charger 405, 12 VDC Battery 410, Inverter 415, PoE Switch/Router 420, and the various wiring needed to connect these items.

Figure 6:
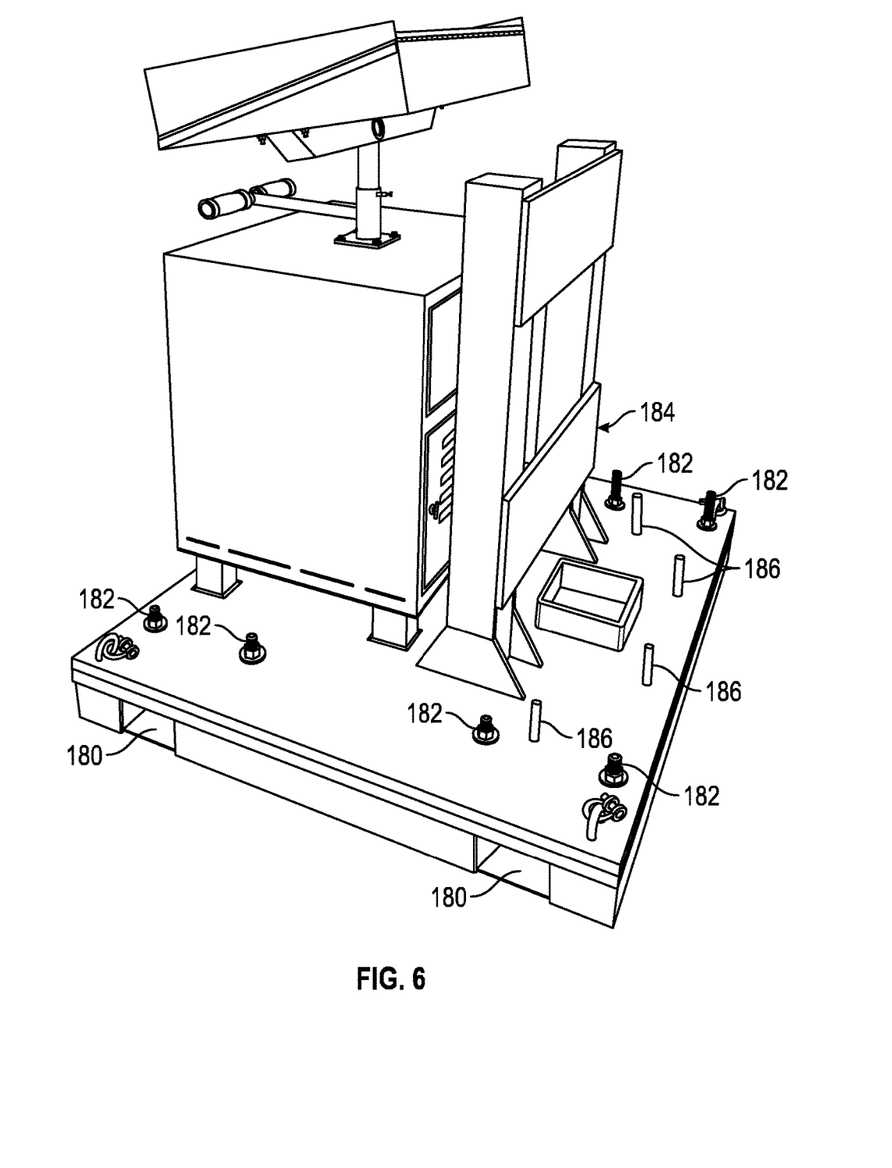
FIG. 6 depicts details of one embodiment of the invention without any RFID panels attached to the base.

FIG. 6

FIG. 6 shows the equipment Cabinet 110 and the Base 175 without any of the Panels 153 attached. There are two Fork Access Holes 180 which are sized to accept the forks of a standard forklift. Eight Fork Mounting Bolts 182 (only six are shown in FIG. 6) are used to secure the forks of the forklift to Base 175. Underneath the Base 175, there is a metal plate (not shown) for each pair of Fork Mounting Bolts 182 which can be drawn tightly to the underside of Base 175 when the nuts associated with each Fork Mounting Bolt 182 are tightened. When the tower inventory system needs to be transported through the warehouse in order to conduct an inventory, the forklift is driven so that the forks are inserted into the Fork Access Holes 180 so that the each fork is above the metal plate. Once fully inserted, the nuts on each of the eight Fork Mounting Bolts 182 are tightened so that each fork is drawn securely to the underside of Base 175 by two of the metal plates thus securing the entire TIS to the Base 175.

Mast Support Frame 184 is securely attached to Base 175 and is used to securely support the Mast 160. Panels 152 and 153 are secured to Mast 160 via Mast Support Clamp 162 and RFID Panel Clamp 164. Extending upward from Base 175 are four Panel Alignment Pins which are used to properly position the Panel to the Base 175.

Figure 7:
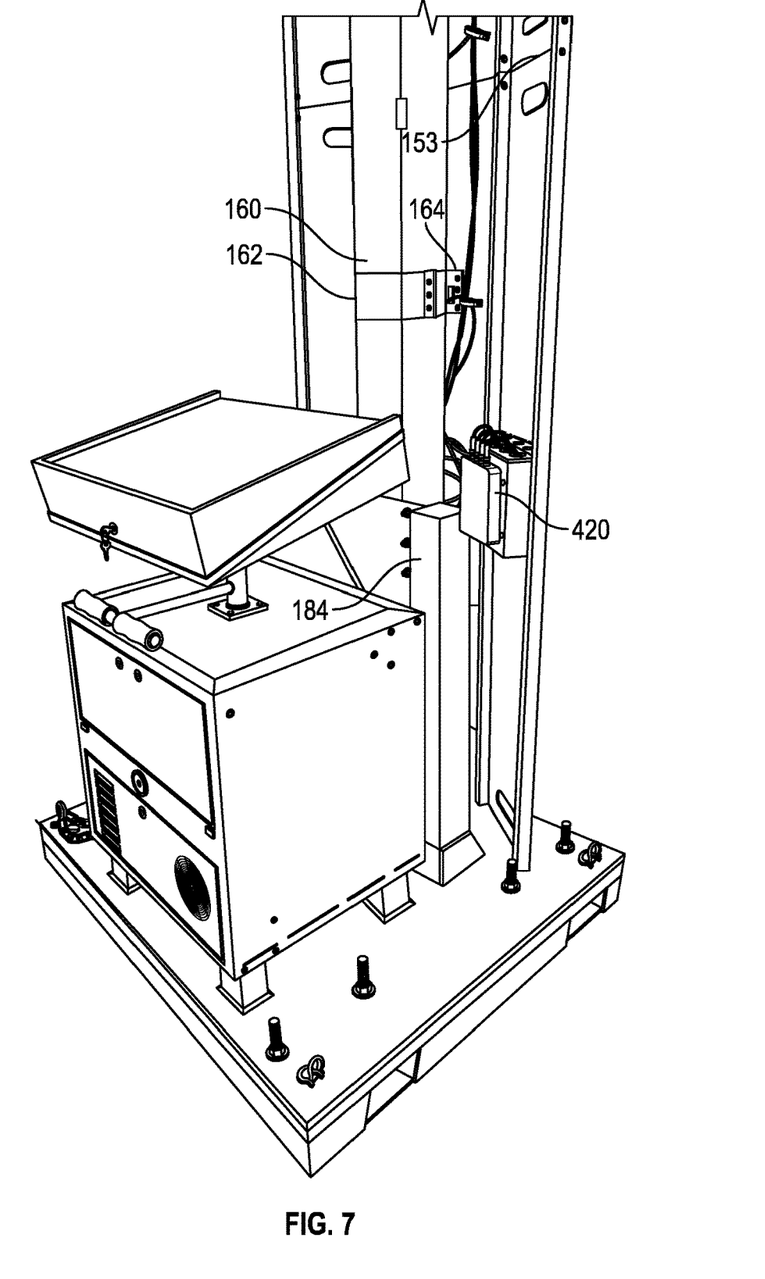
FIG. 7 depicts an alternate view of one embodiment of the invention.

FIG. 7

FIG. 7 shows the back side of the Panels 153 and how they are attached to Base 175. Mast 160 is typically a 6" square tube. There are eight Panel Clamps 164, two of which are attached to each of the four Panels 153. Mast Support Clamp 162 is U-shaped and is positioned around Mast 160. Each end of Mast Support Clamp 162 is attached to one of the Panel Clamps which is mounted on each for the four panels. One of the four RFID Readers 430 is shown mounted to the back of the first Panel 153. In this embodiment, the other three RFID Readers are mounted in similar locations on the other three Panels 153.

Various alterations in the location of the components such as the battery charger, inverter, battery, PoE switch/router will be obvious to one skilled in the art. In addition, variations of the type and location of the computer and switch/router will be obvious to one skilled in the art.

The invention is not limited to any of the embodiment, the examples and the modifications described herein but may be implemented by a diversity of other configurations without departing from the scope of the invention. Accordingly, the description is intended to embrace all such alternatives, modifications and variances which fall within the scope of the appended claims.

What is claimed is:

1. A method for determining the x, y, and z coordinates for a plurality of RFID Asset Tags each Asset Tag being affixed to an Asset, each of said plurality of RFID Asset Tags being encoded with a unique identifier, said Asset being positioned on a storage system wherein said method comprises the steps of:
   a. affixing a plurality of RFID location tags at individual known locations which are in proximity to one or more of said plurality of RFID Asset Tags, each of said RFID location tags being encoded with a unique identifier;
   b. providing a movable upright structure;
   c. providing a plurality of RFID antennas located at various known elevations along said movable upright structure;
   d. providing one or more RFID readers wherein each of said plurality of RFID antennas is in electrical communication with one of said one or more RFID readers;
   e. providing a computer in electrical communication with said one or more RFID readers;
   f. moving said upright structure so as to move past the plurality of RFID Asset Tags;
   g. providing RFID inventory software that operates while said upright structure is moving past said plurality of RFID Asset Tags;
   h. said RFID inventory software generates and stores RFID data from any RFID tag; said RFID data comprising
      i. the date and time the RFID signal was captured;
      ii. the strength of the signal for each of said plurality of Asset Location Tags;
      iii. the unique identifier and
      iv. the specific antenna that generated the RFID signal being stored; and
   i. said RFID inventory software being further adapted to be able to determine the x, y and z coordinates for any one of said plurality of RFID Asset Tags which was recognized by the computer.

2. The method of claim 1 wherein the x coordinate for a particular RFID asset tag is determined by comparing the time and date stamp of two RFID location tags and the particular RFID asset Tag.

3. The method of claim 1 wherein the z coordinate is determined by evaluating which of the plurality of antennas has the highest signal strength and comparing that to the known elevation of the antenna having the highest signal strength.

4. The method of claim 1 wherein the y coordinate is determined by comparing the signal strength of the RFID Asset data to empirically determined signal strength based on the distance away from the antenna that provided the signal in the RFID data.

5. The method of claim 1 wherein the x, y, and z coordinates of multiple RFID data records for the same RFID Asset tag are averaged to provide composite x, y, z coordinates.

6. The method of claim 1 wherein said movable upright structure is moved via overhead tracks which allow the movable upright structure to be moved past all of the RFID tags.

7. The method of claim 6 wherein the movable upright structure is moved along the overhead tracks by means of a motorized roller.

8. A system for determining the x, y, and z coordinates for a plurality of RFID asset tags, each asset tag being affixed to an asset, each of said plurality of RFID asset tags being encoded with at least a unique identifier, said asset being stored on a shelving system; said system comprising:
   a. a plurality of RFID location tags affixed at individual known locations which are in proximity to one or more of said plurality of RFID Asset Tags; each of said plurality of RFID location tags being encoded with at least a unique identifier;
   b. a movable upright structure adapted to be moved past the plurality of RFID Asset Tags and past the plurality of RFID Location Tags;
   c. one or more RFID antennas located at various known elevations along said movable upright structure;
   d. one or more RFID readers wherein each of said plurality of RFID antennas is in electrical communication with one of said one or more RFID readers;
   e. a computer in electrical communication with said one or more RFID readers;
   f. RFID inventory software that runs on said computer and operates while said upright structure is moving past said plurality of RFID Asset tags and the plurality of RFID location tags;
   g. said RFID inventory software gathers and stores, at regular intervals, all of the RFID signals obtained from either RFID location tags or RFID asset tags as the upright structure moves past any RFID tag;
   h. said RFID inventory software further adapted to capture and store RFID data from any RFID tag, said RFID data comprising
      i. the date and time the RFID signal was stored,
      ii. the strength of the signal for each of said plurality of Asset location tags,
      iii. a unique identifier and
      iv. the specific antenna that generated the RFID signal being stored; and
   i. said RFID inventory software being further adapted to be able to determine the x, y and z coordinates for any one of said plurality of RFID assets tags which was recognized by the computer.

9. The system of claim 8 wherein the x coordinate for a particular RFID asset tag is determined by comparing the time and date stamp of two RFID location tags and the particular RFID asset Tag.

10. The system of claim 8 wherein the z coordinate for a particular RFID asset tag is determined by evaluating which of the plurality of antennas has the highest signal strength for the particular RFID asset tag and comparing that to the known elevation of the antenna having the highest signal strength.

11. The system of claim 8 wherein the y coordinate for a particular RFID asset tag is determined by comparing the signal strength of the particular RFID Asset data to empirically determined signal strength based on the distance away from the antenna that provided the signal in the RFID data.

12. The system of claim 8 wherein the x, y, and z coordinates of multiple RFID data records for the same RFID asset tag are averaged to provide a composite x, y, z coordinates.

13. The system of claim 8 wherein said movable upright structure is moved via overhead tracks which allows the movable upright structure to be moved past all of the RFID tags.

14. The system of claim 13 wherein the movable upright structure is moved along the overhead tracks by means of a motorized roller.

* * * * *